United States Patent
Lester et al.

(10) Patent No.: US 6,961,800 B2
(45) Date of Patent: Nov. 1, 2005

(54) METHOD FOR IMPROVING PROCESSOR PERFORMANCE

(75) Inventors: Robert A. Lester, Tomball, TX (US); Kenneth T. Chin, Cypress, TX (US); Jim Blocker, Cypress, TX (US); John E. Larson, Houston, TX (US); Phillip M. Jones, Spring, TX (US); Paul B. Rawlins, Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 371 days.

(21) Appl. No.: 09/967,155

(22) Filed: Sep. 28, 2001

(65) Prior Publication Data

US 2003/0065844 A1    Apr. 3, 2003

(51) Int. Cl.⁷ ............................................. G06F 13/36
(52) U.S. Cl. ..................................... 710/306; 710/310
(58) Field of Search ............................... 710/310, 308, 710/305, 306, 311, 314, 315

(56) References Cited

U.S. PATENT DOCUMENTS

| | | | | |
|---|---|---|---|---|
| 5,313,626 A | * | 5/1994 | Jones et al. ................. | 395/575 |
| 5,331,646 A | * | 7/1994 | Krueger et al. ............. | 371/40.1 |
| 5,367,669 A | * | 11/1994 | Holland et al. ............. | 395/575 |
| 5,613,059 A | * | 3/1997 | Stallmo et al. ............... | 714/6 |
| 5,761,444 A | * | 6/1998 | Ajanovic et al. ........... | 710/100 |
| 5,870,567 A | * | 2/1999 | Hausauer et al. ........... | 710/310 |
| 5,937,171 A | * | 8/1999 | Sarangdhar et al. ........ | 710/105 |
| 6,012,118 A | * | 1/2000 | Jayakumar et al. ......... | 710/107 |
| 6,073,198 A | * | 6/2000 | Meyer et al. ............... | 710/110 |
| 6,098,132 A | * | 8/2000 | Olarig et al. ............... | 710/103 |
| 6,223,301 B1 | * | 4/2001 | Santeler et al. ............. | 714/6 |
| 6,647,454 B1 | * | 11/2003 | Solomon ..................... | 710/310 |
| 6,681,283 B1 | * | 1/2004 | Thekkath et al. ........... | 710/305 |
| 2003/0037198 A1 | * | 2/2003 | Hunsaker ..................... | 710/313 |

* cited by examiner

Primary Examiner—Khanh Dang
Assistant Examiner—Trisha Vu

(57) ABSTRACT

Methods for improving processor performance. Specifically, by reducing some of the latency cycles within a host controller, request processing speed can be improved. One technique for improving processing speed involves initiating a deferred reply transaction before the data is available from a memory controller. A second technique involves anticipating the need to transition from a block next request (BNR) state to a bus priority request (BPRI) state, thereby eliminating the need to wait for a request check to determine if the BPRI state must be implemented.

23 Claims, 3 Drawing Sheets

METHOD FOR IMPROVING PROCESSOR PERFORMANCE

CROSS-REFERENCE TO RELATED APPLICATIONS

The following commonly owned applications are hereby incorporated for all purposes:

U.S. patent application Ser. No. 09/965,894, filed concurrently herewith, entitled "Efficient Snoop Filter in a Multiple-Processor-Bus System" by Paul B. Rawlins, Phil M. Jones, and Ahmed Farhan; and U.S. patent application Ser. No. 10/002,809, U.S. Pat. No. 6,886,048, filed concurrently herewith, entitled "Technique for Processing Out-of-Order Requests in a Processor-Based System" by Elizabeth A. Richard and John E. Larson.

BACKGROUND OF THE INVENTION

1. Field of the Invention

This invention relates generally to a method for improving processor performance and, more particularly, to a method for issuing transactions with minimum latency.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Computer usage has increased dramatically over the past few decades. In past years, computers were relatively few in number and primarily used as scientific tools. However, with the advent of standardized architectures and operating systems, computers have become virtually indispensable for a wide variety of uses from business applications to home computing. Whether a computer system is a personal computer or a network of computers connected via a server interface, computers today rely on processors, associated chip sets, and memory chips to perform most of the processing functions, including the processing of system requests. The more complex the system architecture, the more difficult it becomes to efficiently process requests in the system.

Some systems, for example, include multiple processing units or microprocessors connected via a processor bus. To coordinate the exchange of information among the processors, a host controller is generally provided. The host controller is further tasked with coordinating the exchange of information between the plurality of processors and the system memory. The host controller may be responsible not only for the exchange of information in the typical Read-Only Memory (ROM) and the Random Access Memory (RAM), but also the cache memory in high speed systems. Cache memory is a special high speed storage mechanism which may be provided as a reserved section of the main memory or as an independent high-speed storage device. Essentially, the cache memory is a portion of the RAM which is made of high speed static RAM (SRAM) rather than the slower and cheaper dynamic RAM (DRAM) which may be used for the remainder of the main memory. Alternatively, cache memory may be located in each processor. By storing frequently accessed data and instructions in the SRAM, the system can minimize its access to the slower DRAM and thereby increase the request processing speed in the system.

The host controller may be responsible for coordinating the exchange of information among several buses, as well. For example, the host controller may be responsible for coordinating the exchange of information from input/output (I/O) devices via an I/O bus. Further, more and more systems implement split processor buses, which means that the host controller is tasked with exchanging information between the I/O bus and a plurality of processor buses. With increased processor and memory speeds becoming more essential in today's fast-paced computing environment, it is advantageous to facilitate the exchange of information in the host controller as quickly as possible. Due to the complexities of the ever expanding system architectures which are being introduced in todays computer systems, the task of coordinating the exchange of information becomes increasingly difficult. Because of the increased complexity in the design of the host controller due to the increased complexity of the system architecture, more cycle latency is injected into the cycle time for processing system requests among the I/O devices, processing units, and memory devices which make up the system. By reducing injected cycle latency within the host controller, computer systems may be advantageously optimized.

The present invention may be directed to one or more of the problems as set forth above.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
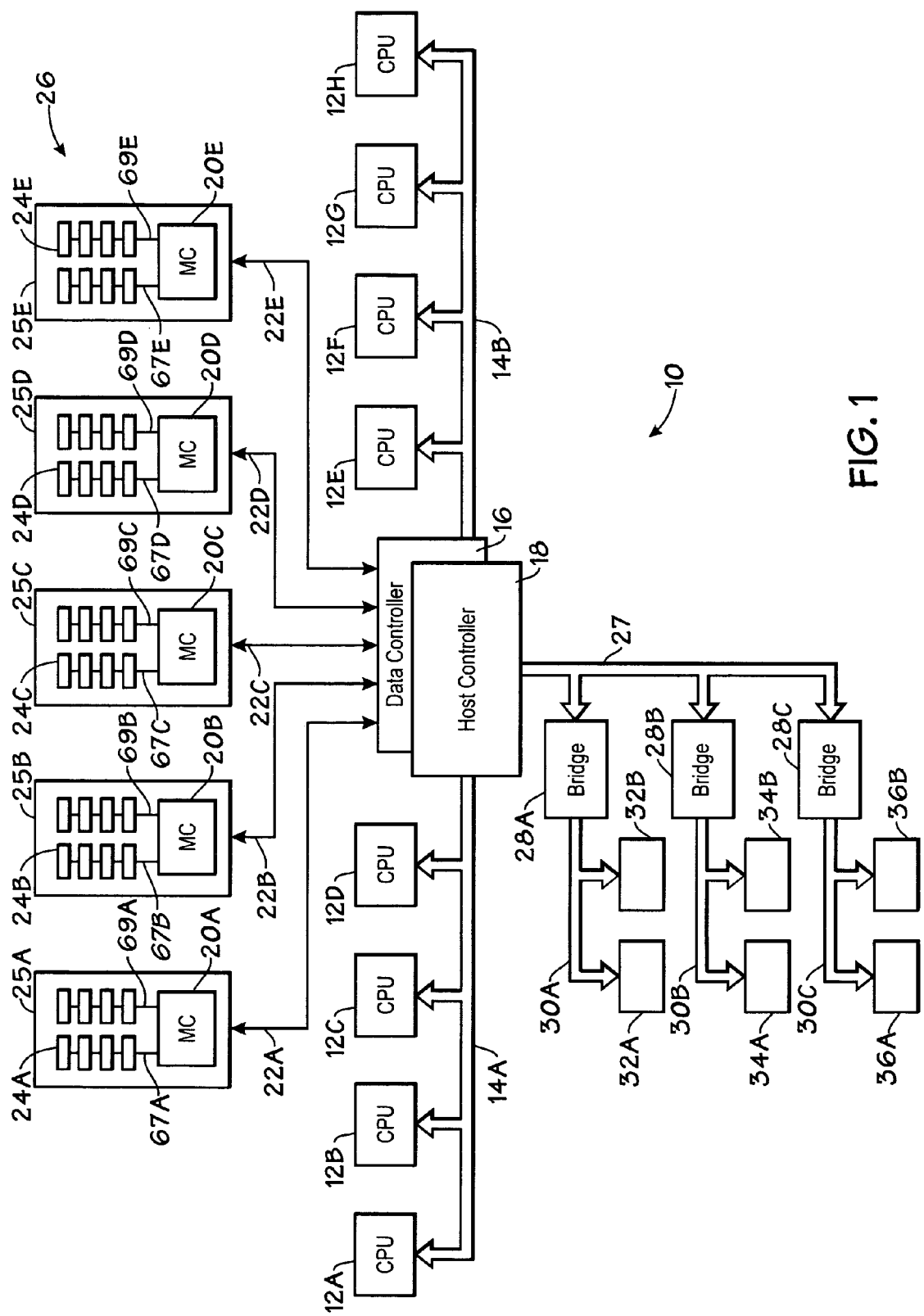
FIG. 1 is a block diagram illustrating an exemplary computer system having a multiple processor bus architecture.

Turning now to the drawings and referring initially to FIG. 1, a block diagram of an exemplary computer system with multiple processor buses and an I/O bus, generally designated as reference numeral 10, is illustrated. The computer system 10 typically includes one or more processors or CPUs. In the exemplary embodiment, the system 10 utilizes eight CPUs 12A–12H. The system 10 utilizes a split-bus configuration in which the CPUs 12A–12D are coupled to a first bus 14A and the CPUs 12E–12H are coupled to a second bus 14B. It should be understood that the processors or CPUs 12A–12H may be of any suitable type, such as a microprocessor available from Intel, AMD, or Motorola, for example. Furthermore, any suitable bus configuration may be coupled to the CPUs 12A–12H, such as a single bus, a split-bus (as illustrated), or individual buses. By way of example, the exemplary system 10 may utilize Intel Pentium III processors and the buses 14A and 14B may operate at 100/133 MHz.

Each of the buses 14A and 14B is coupled to a chip set which includes a host controller 16 and a data controller 18. In this embodiment, the data controller 18 is effectively a data cross-bar slave device controlled by the host controller 16. The data controller 18 may be used to store data from one area of the system 10 awaiting transfer to a requesting area of the system 10. Because of the master/slave relationship between the host controller 16 and the data controller 18, the chips may be referred to together as the host/data controller 16, 18. The host/data controller 16, 18 is further coupled to a main memory 24 via one or more memory controllers. In this particular example, the host/data controller 16, 18 is coupled to five memory controllers 20A–20E via five individual bus sections 22A–22E, respectively. Each of the memory controllers 20A–20E is further coupled to a segment of main memory designated as 24A–24E, respectively. As discussed in detail below, each of the memory segments or modules 24A–24E is typically comprised of dual inline memory modules (DIMMs). Further, each memory module 24A–24E and respective memory controller 20A–20E may comprise a single memory cartridge 25A–25E which may be removable. In the present configuration, data may be stored in a "4+1" parity striping pattern wherein one of the memory cartridges 25A–25E is used to provide redundancy for the collective memory system 26, thereby providing hot plug capabilities for the memory cartridges 25A–25E.

The host/data controller 16, 18 is typically coupled to one or more bridges 28A–28C via an Input/Output (I/O) bus 27. The opposite side of each bridge 28A–28C is coupled to a respective bus 30A–30C, and a plurality of peripheral devices 32A and 32B, 34A and 34B, and 36A and 36B may be coupled to the respective buses 30A, 30B, and 30C. The bridges 28A–28C may be any of a variety of suitable types, such as PCI, PCI-X, EISA, AGP, etc.

Each CPU 12A–12H may include a segment of cache memory for storage of frequently accessed data and programs. Maintaining coherency among the plurality of caches in the CPUs 12A–12H is important to the efficient operation of the system 10. Maintaining coherency among the caches found in each CPU 12A–12H is further complicated by the split-bus configuration since coherency should be maintained between the separate buses 14A and 14B. Also, because requests may originate from or may be directed to not only one of the CPUs 12A–12H, but also from one of the peripheral devices 32A–32B, 34A–34B, or 36A–36B, cache coherency should be maintained along the I/O bus 27, as well.

Figure 2:
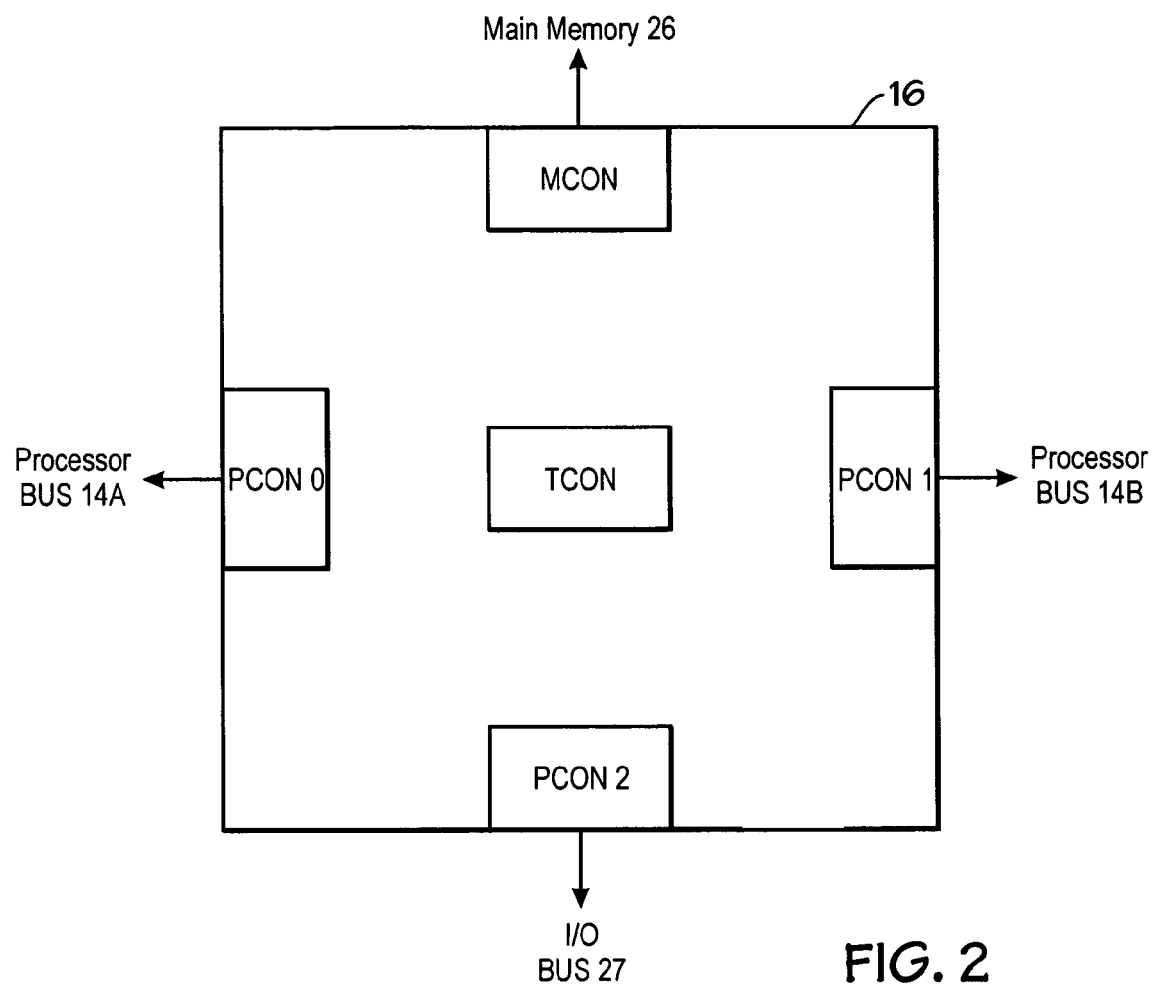
FIG. 2 is a block diagram illustrating an exemplary host controller in accordance with the present system.

FIG. 2 illustrates a block diagram of the host controller 16. The host controller 16 generally coordinates the exchange of requests and data from the processor buses 14A and 14B, the I/O bus 27, and the memory 26. The host controller 16 includes a master memory controller MCON which facilitates communication with the individual memory controllers 20A–20E in each memory module 25A–25E. The host controller 16 also includes a processor controller PCON for each of the processor and I/O buses 14A, 14B, and 27. For simplicity, the processor controller corresponding to the processor bus 14A is designated as "PCON0." The processor controller corresponding to the processor bus 14B is designated as "PCON1." The processor controller corresponding to the I/O bus 27 is designated as "PCON2." Essentially, each processor controller PCON0–PCON2 serves the same function, which is to connect a respective bus external to the host controller 16 (i.e., processor bus 14A and 14B and I/O bus 27) to the internal blocks of the host controller 16. Thus, the processor controllers PCON0–PCON2 facilitate the interface from the host controller 16 to each of the buses 14A, 14B, and 27. Further, in an alternate embodiment, a single processor controller PCON may serve as the interface for all of the system buses 14A, 14B, and 27. The processor controllers PCON0–PCON2 may be referred to collectively as "PCON." Any number of specific designs for the processor controller PCON and the memory controller MCON may be implemented in conjunction with the techniques described herein, as can be appreciated by those skilled in the art.

The host controller 16 also includes a tag controller TCON. The tag controller TCON maintains coherency and request cycle ordering in the system 10. "Cache coherence" refers to a protocol for managing the caches in a multiprocessor system so that no data is lost or over-written before the data is transferred from the cache to a requesting or target device. Because frequently accessed data may be stored in the cache memory, a requesting agent should be able to identify which area of the memory 26 (cache or non-cache) it should access to retrieve the requested information as efficiently as possible. A "tag RAM" is an area in the cache that identifies which data from the main memory is currently stored in each cache line. The actual data is stored in a different part of the cache called the data store. The values stored in the tag RAM determine whether the actual data can be retrieved quickly from the cache or whether the requesting device should access the slower DRAM portion of the main memory 26. Thus, the tag controller TCON maintains coherency in cycle ordering and controls access to the tag RAM. Any number of specific designs for a tag controller TCON for maintaining coherency may be implemented in conjunction with the techniques described herein, as can be appreciated by those skilled in the art.

The present embodiment describes at least two mechanisms for reducing the cycle time to process requests through the host controller 16. When a READ request is issued by an agent on one of the buses 14A, 14B, or 27 (i.e., a CPU 12A–12E or I/O device 32A–32B, 34A–34B, 36A–36B), the request is received at the host controller 16 by one of the corresponding processor controllers PCON0-2. The processor controller PCON then communicates with the tag controller TCON and the memory controller MCON to coordinate the scheduling of the retrieval of the data requested by the agent. In certain situations, the host controller 16 is unable to process the request immediately. For instance, the host controller 16 may be too busy processing other transactions or may need to exchange data among the multiple buses in a delayed manner to prevent lock up of the system. In these cases, rather than returning the requested data, the processor controller PCON defers the cycle, freeing it from the bus and indicating that the cycle will be completed at a later time. When PCON is ready to complete the cycle, it issues a "deferred reply" on the bus corresponding to the requesting agent. Because of processor specific timing requirements and the associated architectural protocol, once a deferred reply is issued, the processor controller PCON waits some period of time (generally, at least seven clock cycles) from the issuance of the deferred reply until the appropriate data can be sent to the requesting agent and the request can be retired.

A first technique for reducing request cycle time involves implementing an early deferred reply signal when the host controller 16 is unable to process the request immediately. Generally, if the host controller 16 is unable to process the request immediately, due to heavy traffic or to prevent lock-up between buses, the host controller 16 issues a deferred reply only after the data has been retrieved from the memory 26. Using this technique, a request is initially received by the processor controller PCON. The processor controller PCON coordinates with the tag controller TCON and the memory controller MCON to schedule and acquire the requested information. The tag controller TCON and the memory controller MCON coordinate to find the address corresponding to the request as quickly as possible. Once the address corresponding to the request is located, the data is retrieved from the appropriate area of memory and delivered to the memory controller MCON. At this point, the memory controller MCON delivers a data ready signal (RDRDY) to the processor controller PCON0–PCON2 that initiated the request from the requesting device. At this point, the processor controller PCON issues a deferred reply on the requesting bus. Once the bus is able to handle the data and deliver it to the requesting agent, the requested data is sent by the processor controller PCON to the requesting agent. However, as previously mentioned, by issuing the deferred reply, the processor controller PCON waits some period, at least seven clock cycles for example, before the data can be sent onto the requesting bus and to the requesting agent, even if the requesting bus is not busy and can handle the data immediately. Disadvantageously, this particular method of processing a request in which a deferred reply is initiated may add undesirable cycle time to the processing of the request.

A more efficient method of processing the request is to issue the deferred reply to the issuing bus once all deadlocks have been avoided regardless of whether the data has been retrieved from the memory 26 and delivered to the memory controller MCON. Thus, once the requesting bus has enough bandwidth to handle the request, the processor controller PCON issues the deferred reply. A deferred reply may be issued as early as the clock cycle immediately subsequent to the clock cycle in which the request was originally deferred. Because the system architecture may require at least seven clock cycles from the issuance of the deferred reply until data can be moved onto a requesting bus, there is already a delay added to the processing of the request. By initiating the deferred reply immediately upon the availability of the requesting bus, the latent clock cycles associated with the issuance of the deferred reply and defined by the system protocol can be used in transferring the data from memory 26 to the memory controller MCON. Thus, once the wait period (here seven clock cycles) has expired, the data may be waiting in the memory controller MCON for immediate delivery onto the requesting bus since the memory controller MCON has at least seven clock cycles to acquire and retrieve the data from memory. By using the natural delays associated with standard protocols to carry out tasks (previously performed in series) in parallel, there may be a reduction in the latency associated with processing the request (e.g. seven clock cycles).

Figure 3:
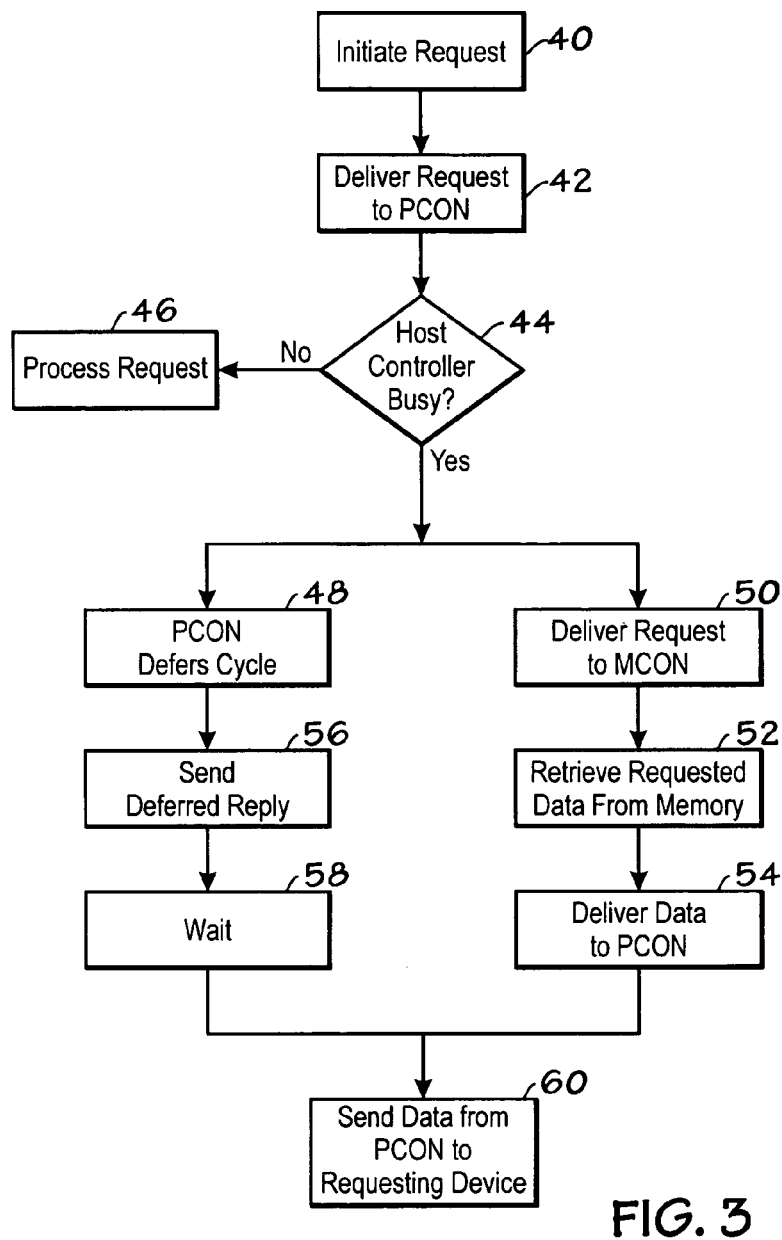
FIG. 3 is a flow chart illustrating a method of processing a request in accordance with the present techniques.

The improved method of processing a request is further illustrated with reference to FIG. 3. First, a request is initiated by a requesting device, such as a CPU 12A–12H or I/O device 32A–32B, as indicated by block 40. The request is then delivered to the processor controller PCON0–PCON2 corresponding to the bus 14A, 14B or 27, on which the requesting device resides, as indicated by block 42. The next step depends on whether the host controller 16 is too busy to immediately process the request, as indicated by block 44. If the host controller 16 is not busy, the request will be processed immediately, as indicated by block 46. If the host controller 16 is too busy to process the request when it is received, the processor controller PCON0–PCON2 frees the corresponding bus, thereby indicating that the request will be processed later, as indicated by block 48. By freeing the corresponding bus, the processor controller PCON mitigates any bottlenecks that may be caused by forcing the bus into a wait state.

Meanwhile, the request is delivered to the memory controller MCON, as indicated by block 50, and the requested data is retrieved from memory, as indicated by block 52. The requested data is then delivered to the corresponding processor controller PCON0–PCON2, as indicated by block 54. Once the processor controller PCON0–PCON2 is able to handle the request, it initiates a deferred reply signal, as indicated by block 56. As previously stated, prior systems wait until the steps of delivering the request to the memory controller MCON (block 50), retrieving the requested data from memory (block 52), before issuing a deferred reply and delivering the data to the processor controller PCON0–PCON2 (block 54). In the present embodiment, the deferred reply is sent immediately upon the availability of the corresponding processor controller PCON0–PCON2. It should be understood that the deferred reply may actually be sent at any time during the steps indicated in blocks 50-54 if the corresponding processor controller PCON0–PCON2 is available.

Once the deferred reply is sent, the processor controller PCON0–PCON2 must wait some period of time defined by the system protocol (e.g., seven clock cycles), as indicated by block 58. Once the data has been delivered to the corresponding processor controller PCON0–PCON2 (i.e. the step indicated by block 54 has been completed), the requested data can then be sent to the requesting device and the request can be retired, as indicated in block 60.

A second technique for reducing request cycle time involves the queues associated with the processor controller PCON. Once the host controller 16 receives a request, the processor controller PCON0–PCON2 accepts the requests and stores it in one of several queues depending on the request type. If any of the queues in the processor controller PCON0–PCON2 is full, the host controller 16 issues a block next request (BNR) signal to stall all buses and to prevent additional cycle requests from being received and added to the queues. Disadvantageously, by asserting the BNR signal, the host controller 16 is also prevented from processing any transactions. Often, however, it is necessary for the host controller 16 to issue snoop requests or deferred reply transactions to clear the queues. In this case, the host controller 16 will detect that a transaction, such as a snoop or a deferred reply, is to be executed. After detecting that the host controller 16 will execute one or more operations to clear a queue, the host controller 16 will assert a priority agent request (BPRI) signal. The BPRI signal is a different type of request which blocks external agents, such as those attached to the processor and I/O buses 14A, 14B, and 27, from issuing requests to the host controller 16 but gives certain priority agents, such as the host controller 16, the ability to process requests. Once the BPRI signal is asserted, the host controller 16 can de-assert the BNR signal. However, this method of asserting the request signals is inefficient since the step of detecting that certain transactions are to be run by a priority agent takes some amount of time (such as two to four clock cycles) and, thus, adds latency to the processing of the request.

Figure 4:
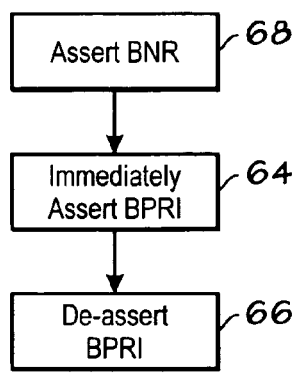
FIG. 4 is a flow chart illustrating a technique for asserting an interrupt in a system in accordance with the present implementation.

An improved process for asserting the interrupt signals involves eliminating the detection step described above. The improved process is further illustrated with reference to FIG. 4. When an internal queue limit is reached, the priority agent (here the host controller 16) asserts a BNR signal to stall the buses to prevent additional cycles from being initiated, as indicated by block 62. Based on the probability that the host controller 16 will need to process requests which will require assertion of a BPRI signal, the BPRI can be asserted immediately upon receipt of the request, as indicated by block 64, and the BNR can then be de-asserted, as indicated by block 66. Thus, the requests, such as snoops and deferred replies, can be processed quickly while still blocking incoming requests from surrounding buses. By anticipating that a request is to be run by a priority agent, the detection step is eliminated and the cycle time to process the request is thereby reduced by at least two to four clock cycles.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of processing a request in a computer system, comprising the acts of:
    (a) initiating a read request from a requesting agent, the requesting agent residing on a bus, wherein the read request has an address corresponding to a memory location;
    (b) receiving the read request at a processor controller;
    (c) sending the read request from the processor controller to an access controller;
    (d) sending a deferred reply from the processor controller to the requesting agent when the processor controller is free to process the read request, regardless of whether data corresponding to the read request has been delivered from the memory location to the processor controller wherein the deferred reply is sent before data corresponding to the read request is delivered to the access controller;
    (e) delivering data residing at the address corresponding to the memory location to the access controller;
    (f) delivering the data from the access controller to the processor controller; and
    (g) delivering the data from the processor controller to the requesting agent.

2. The method of processing a request, as set forth in claim 1, comprising the act of sending a data ready signal from the access controller to the processor controller upon receipt of the data at the access controller.

3. The method of processing a request, as set forth in claim 1, wherein act (a) comprises the act of initiating a read request from a processor residing on a processor bus.

4. The method of processing a request, as set forth in claim 1, wherein act (a) comprises the act of initiating a read request from a peripheral device residing on an input/output (I/O) bus.

5. The method of processing a request, as set forth in claim 1, wherein act (c) comprises the act of sending the request from the processor controller to a memory controller.

6. The method of processing a request, as set forth in claim 1, wherein act (c) comprises the act of sending the request from the processor controller to a tag controller.

7. The method of processing a request, as set forth in claim 1, wherein act (d) comprises the act of sending a deferred reply immediately upon the agent bus being available to receive data from the memory location.

8. The method of processing a request, as set forth in claim 1, wherein act (d) comprises the act of waiting a predetermined number of clock cycles after the deferred reply is sent before delivering data.

9. The method of processing a request, as set forth in claim 1, wherein acts (d) and (f) are performed simultaneously.

10. The method of processing a request, as set forth in claim 1, wherein the acts are performed in the recited order.

11. A method of processing a request in a computer system, comprising the acts of:
    (a) sending a request from a processor controller to an access controller on a first clock cycle, the request originating from an agent to initiate read request to a memory system; and
    (b) sending a deferred reply from the processor controller to the agent on a second clock cycle, the second clock cycle being immediately subsequent to the first clock cycle when the processor controller is free to process the read request, regardless of whether data corresponding to the read request has been delivered from the memory system to the processor controller.

12. The method of processing a request, as recited in claim 11, wherein act (a) comprises the act of sending a request from a processor controller to a memory controller on a first clock cycle.

13. The method of processing a request, as set forth in claim 11, wherein act (a) comprises the act of sending a request for a processor controller to a tag controller on a first clock cycle.

14. A computer system comprising:
    a plurality of buses;
    a memory system operably coupled to the plurality of buses; and
    a processor controller coupled to each of the plurality of buses and configured to simultaneously issue a deferred reply to a requesting device when the processor controller is free to process the read request, regardless of whether data corresponding to the read request has been delivered from the memory system to the processor controller, in response to receiving a read request from the requesting device and obtain the data corresponding to the read request from the memory system.

15. The computer system, as set forth in claim 14, wherein at least one of the plurality of buses comprises a processor bus.

16. The computer system, as set forth in claim 14, wherein at least one of the plurality of buses comprises an input/output (I/O) bus.

17. The computer system, as set forth in claim 14, wherein the processor controller is further configured to obtain the data corresponding to the read request from the memory system before issuing a deferred reply to a requesting device.

18. The computer system, as set forth in claim 14, wherein the memory system comprises a redundant memory system.

19. A computer system comprising:
- a memory system;
- a requesting agent operably coupled to the memory system and configured to initiate read requests to the memory system; and
- a processor controller coupled between the memory system and the requesting agent and configured to send a deferred reply from the processor controller to the requesting agent when the processor controller is free to process the read request, regardless of whether data corresponding to the read request has been delivered from the memory system to the processor controller.

20. The computer system, as set forth in claim 19, wherein the requesting agent comprises a processor.

21. The computer system, as set forth in claim 19, wherein the requesting agent comprises an input/output (I/O) device.

22. The computer system, as set forth in claim 19, wherein the processor controller is configured to obtain the data corresponding to the read request from the memory system before issuing a deferred reply to the requesting agent.

23. The computer system, as set forth in claim 19, wherein the memory system comprises a redundant memory system.

* * * * *